(12) United States Patent
Murakami et al.

(10) Patent No.: US 6,657,781 B2
(45) Date of Patent: Dec. 2, 2003

(54) MICROSCOPE UNIT

(75) Inventors: Katsuji Murakami, Kamiina-gun (JP); Kazuhiro Kanzaki, Ina (JP); Junichi Ono, Ina (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/989,922

(22) Filed: Nov. 21, 2001

(65) Prior Publication Data

US 2002/0071175 A1 Jun. 13, 2002

Related U.S. Application Data

(63) Continuation of application No. PCT/JP01/02370, filed on Mar. 23, 2001.

(30) Foreign Application Priority Data

Mar. 24, 2000 (JP) ........................................ 2000-083408

(51) Int. Cl.⁷ .................... G02B 21/06; G02B 21/00
(52) U.S. Cl. ...................... 359/381; 359/368; 359/385; 359/390
(58) Field of Search ................................ 359/368–390

(56) References Cited

U.S. PATENT DOCUMENTS 4,661,692 A * 4/1987 Kawasaki .................. 359/363
6,097,538 A * 8/2000 Watanabe et al. ........... 359/390
6,226,118 B1 * 5/2001 Koyama et al. ............ 359/380
6,384,967 B1 * 5/2002 Watanabe et al. ........... 359/385

FOREIGN PATENT DOCUMENTS

| JP | 52-60341 | | 5/1977 |
| JP | 60-53916 | A | 3/1985 |
| JP | 63-133115 | A | 6/1988 |
| JP | 10-73767 | A | 3/1998 |

* cited by examiner

*Primary Examiner*—Thong Nguyen
(74) *Attorney, Agent, or Firm*—Frishauf, Holtz, Goodman & Chick, P.C.

(57) ABSTRACT

A microscope unit of the present invention comprises various optical units relating to a plurality of different microscopic methods, a revolver for an objective lens, to which at least one objective lens is attached, a focusing mechanism which moves the revolver for the objective lens in a direction of an optical axis and focuses the objective lens selectively inserted onto the optical axis, an illumination light source, electromotive actuators which are individually disposed on the various optical units, the revolver for the objective lens, and the focusing mechanism and in which an electromotive control can be carried out, one microscope observation tube in which the various optical units, the revolver for the objective lens, and the focusing mechanism are integrally incorporated, and an attachment portion which is disposed on the microscope observation tube and which is attachable/detachable with respect to supports of various test apparatuses.

8 Claims, 14 Drawing Sheets

FIG. 13

Only incident lighting

| | Bright field observation (a1) | Dark field observation (a2) | Polarization observation (a3) | Differential interference observation (a4) | Macro spot observation (a5) |
|---|---|---|---|---|---|
| BF/DF switching cube | BF | DF | BF | BF | BF |
| Polarizer | × | × | ○ | ○ | × |
| FS | Open | Open | Open | Open | Stop |
| AS | Previous position (adjustable) | Open | Previous position (adjustable) | Previous position (adjustable) | Previous position (adjustable) |
| ND | Previous position (adjustable) | Previous position (adjustable) | Previous position (adjustable) | Previous position (adjustable) | Previous position (adjustable) |
| Analyzer | × | × | ○ | ○ | × |
| Nomarski prism | × | × | × | ○ (Previous position (adjustable)) | × |
| Macro/micro switching shutter | Micro | Micro | Micro | Micro | Macro |

Incident lighting and transmission lighting

| | Bright field observation (b1) | Dark field observation (b2) | Polarization observation (b3) | Differential interference observation (b4) | Macro spot observation (b5) |
|---|---|---|---|---|---|
| BF/DF switching cube | BF | DF | BF | BF | BF |
| Polarizer | × | × | ○ | ○ | × |
| FS | Open | Open | Open | Open | Stop |
| AS | Previous position (adjustable) | Open | Previous position (adjustable) | Previous position (adjustable) | Previous position (adjustable) |
| ND | Previous position (adjustable) | Previous position (adjustable) | Previous position (adjustable) | Previous position (adjustable) | Previous position (adjustable) |
| Analyzer | × | × | ○ | ○ | × |
| Nomarski prism | × | × | × | ○ (Previous position (adjustable)) | × |
| Macro/micro switching shutter | Micro | Micro | Micro | Micro | Macro |
| Lamp voltage (transmission lighting) | Previous value (adjustable) | Previous value (adjustable) | Previous value (adjustable) | Previous value (adjustable) | Previous value (adjustable) |

F I G. 14

MICROSCOPE UNIT

CROSS REFERENCE TO RELATED APPLICATIONS

This is a Continuation Application of PCT Application No. PCT/JP01/02370, filed Mar. 23, 2001, which was not published under PCT Article 21(2) in English.

This application is based upon and claims the benefit of priority from the prior Japanese Patent Application No. 2000-083408, filed Mar. 24, 2000, the entire contents of which are incorporated herein by reference.

BACKGROUND OF THE INVENTION

1. Field of the Invention

The present invention relates to a microscope unit.

2. Description of the Related Art

In conventional microscopes, there are some in which observations can be performed using a single unit by various microscopic methods such as a bright field observation, dark field observation, and differential interference observation. However, this type of microscope has an independent structure, and cannot be attached/detached with respect to other arbitrary apparatuses such as a substrate test apparatus. That is, there is a problem that the conventional microscope is used alone, and cannot be applied to another apparatus, and is insufficient in general-purpose properties. Moreover, for the conventional microscope, when the observation is performed in different microscopic methods, various optical devices have to be manually attached/detached, and a complicated operation has to be carried out.

An object of the present invention is to provide a microscope unit which can be freely attached/detached with respect to a desired position, therefore has a general-purpose property, and which can automatically change a microscopic method.

BRIEF SUMMARY OF THE INVENTION (1) According to the present invention, there is provided a microscope unit comprising: various optical units related to a plurality of different microscopic methods; a revolver for an objective lens, to which at least one objective lens is attached; a focusing mechanism which moves the revolver for the objective lens in a direction of an optical axis and focuses the objective lens selectively inserted onto the optical axis; an illumination light source; electromotive actuators which are individually disposed on the various optical units, the revolver for the objective lens, and the focusing mechanism and in which an electromotive control can be carried out; one microscope observation tube in which the various optical units, the revolver for the objective lens, and the focusing mechanism are integrally incorporated; and an attachment portion which is disposed on the microscope observation tube and which is attachable/detachable with respect to supports of various test apparatuses.

(2) The microscope unit of the present invention is the unit according to the above (1), and comprises a controller which controls the respective electromotive actuators disposed on the various optical units, the revolver for the objective lens, and the focusing mechanism.

(3) The microscope unit of the present invention is the unit according to the above (2), and the controller controls the respective electromotive actuators of the various optical units in accordance with the microscopic method indicated from an operation section.

(4) The microscope unit of the present invention is the unit according to the above (1), and the plurality of microscopic methods include at least two microscopic methods of a bright field observation method, a dark field observation method, a polarization observation method, and a differential interference observation method.

(5) The microscope unit of the present invention is the unit according to the above (1), and each of the various optical units comprises an ND filter adjustment section including an ND filter, an aperture stop adjustment section including an aperture stop, a field stop adjustment section including a field stop, a polarizer attachment/detachment section including a polarizer, a bright field/dark field switching section including a bright field cube and a dark field cube, a Nomarski adjustment section including a Nomarski prism, and an analyzer attachment/detachment section including an analyzer.

(6) The microscope unit of the present invention is the unit according to the above (1), and the microscope observation tube comprises: an objective lens for macro observation disposed in parallel to the optical axis of an objective lens for micro observation attached to the revolver for the objective lens and disposed apart from the optical axis at a predetermined distance; and an electromotive shutter switching section which switches between an optical path of micro observation and an optical path of macro observation divided from the optical path of micro observation.

BRIEF DESCRIPTION OF THE SEVERAL VIEWS OF THE DRAWING

FIGS. 13, 14 are diagrams showing states of respective optical units for a microscopic method according to the embodiment of the present invention.

DETAILED DESCRIPTION OF THE INVENTION

Embodiments of the present invention will be described hereinafter with reference to the drawings.

Figure 1:
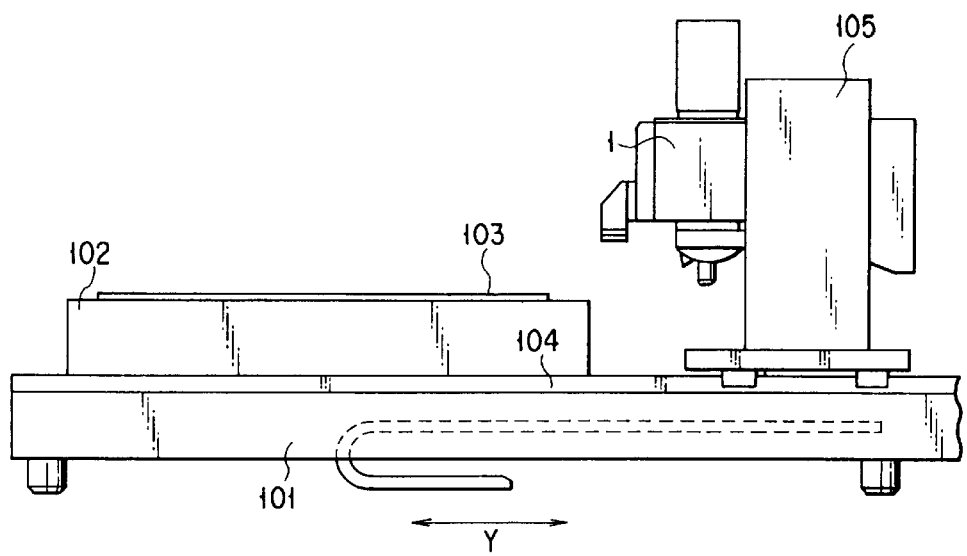
FIG. 1 is a side view showing a configuration of a substrate test apparatus to which a microscope unit according to an embodiment of the present invention is applied.

FIG. 1 is a side view showing a configuration of a substrate test apparatus to which a microscope unit according to a first embodiment of the present invention is applied. In FIG. 1, a holder 102 is disposed on an apparatus main body 101, and a substrate to be tested 103 is laid/held on the holder 102. The substrate to be tested 103 is constituted of a glass substrate, semiconductor wafer substrate, printed substrate, and the like for use in flat displays (FPD) such as a liquid crystal display (LCD).

A pair of guide rails 104, 104 are disposed in parallel in a Y-axis direction along opposite side edges of the holder 102 on the apparatus main body 101. Moreover, a gatepost type microscope unit support 105 is disposed above the holder 102 so as to cross over the holder 102. The microscope unit support 105 is disposed so as to be movable along the guide rails 104, 104 above the substrate to be tested 103, that is, above the holder 102 held in a horizontal state in the Y-axis direction.

A microscope unit 1 is supported on the microscope unit support 105 so as to be movable along a guide rail (not shown) in a direction (X-axis direction) crossing at right angles to a movement direction (Y-axis direction) of the microscope unit support 105. Additionally, the microscope unit 1 has a structure which can freely be attached/detached with respect to desired places such as supports movably held or fixed to apparatus bases in various substrate test apparatuses for observing, testing or measuring various substrates to be tested in a micro manner.

Figure 2:
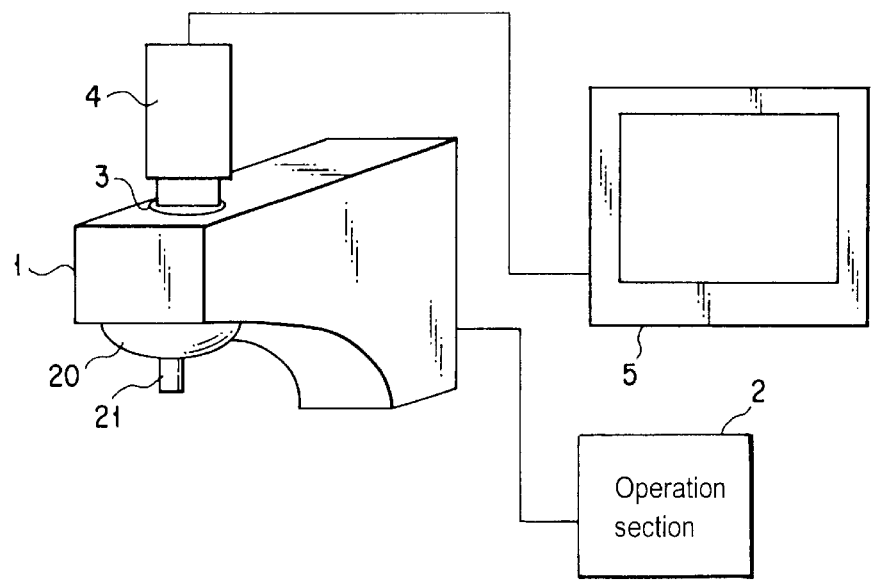
FIG. 2 is a diagram showing a configuration of the microscope unit according to the embodiment of the present invention.
Figure 3A:
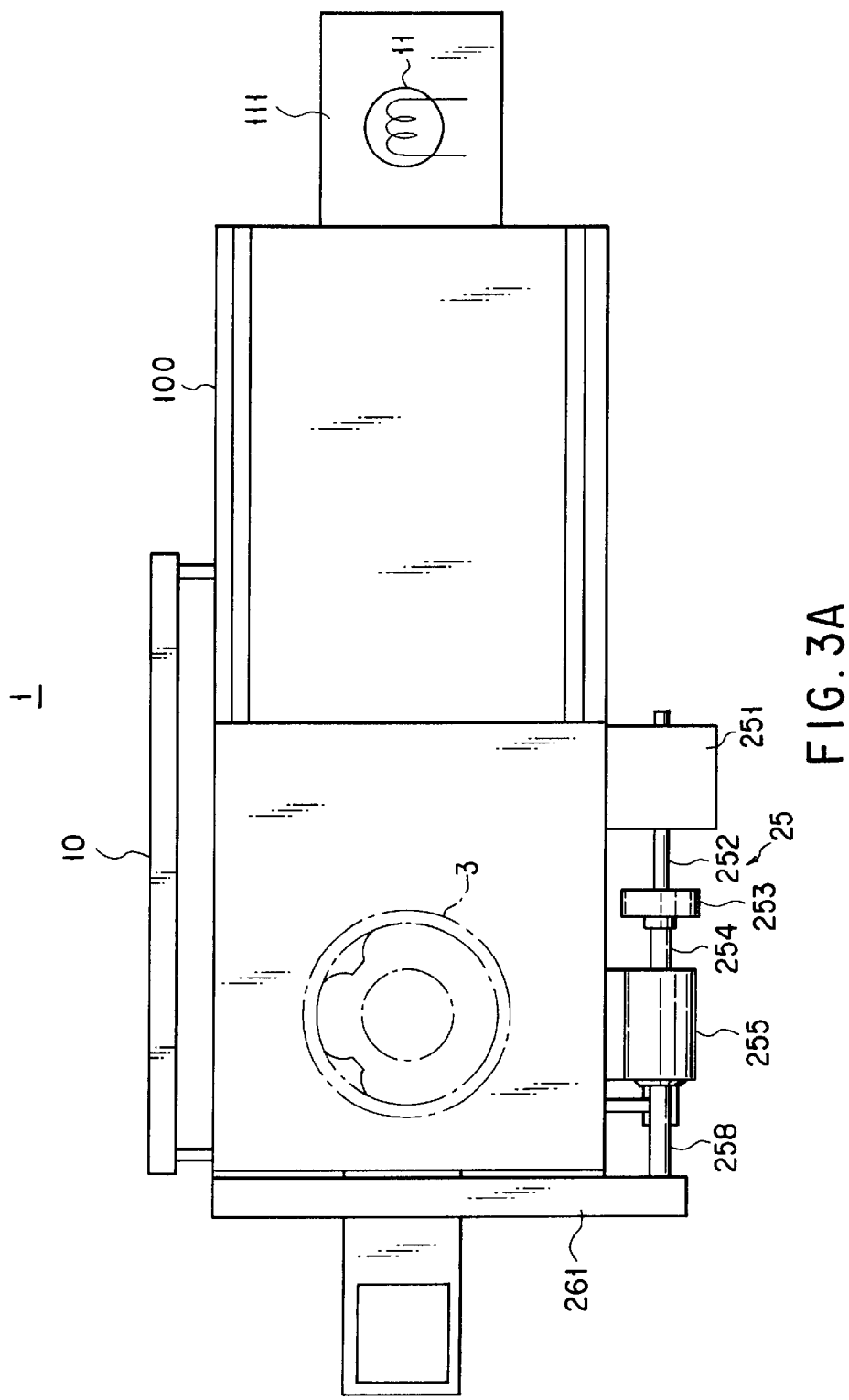
FIG. 3A is a top plan view showing the configuration of the microscope unit according to the embodiment of the present invention.
Figure 3B:
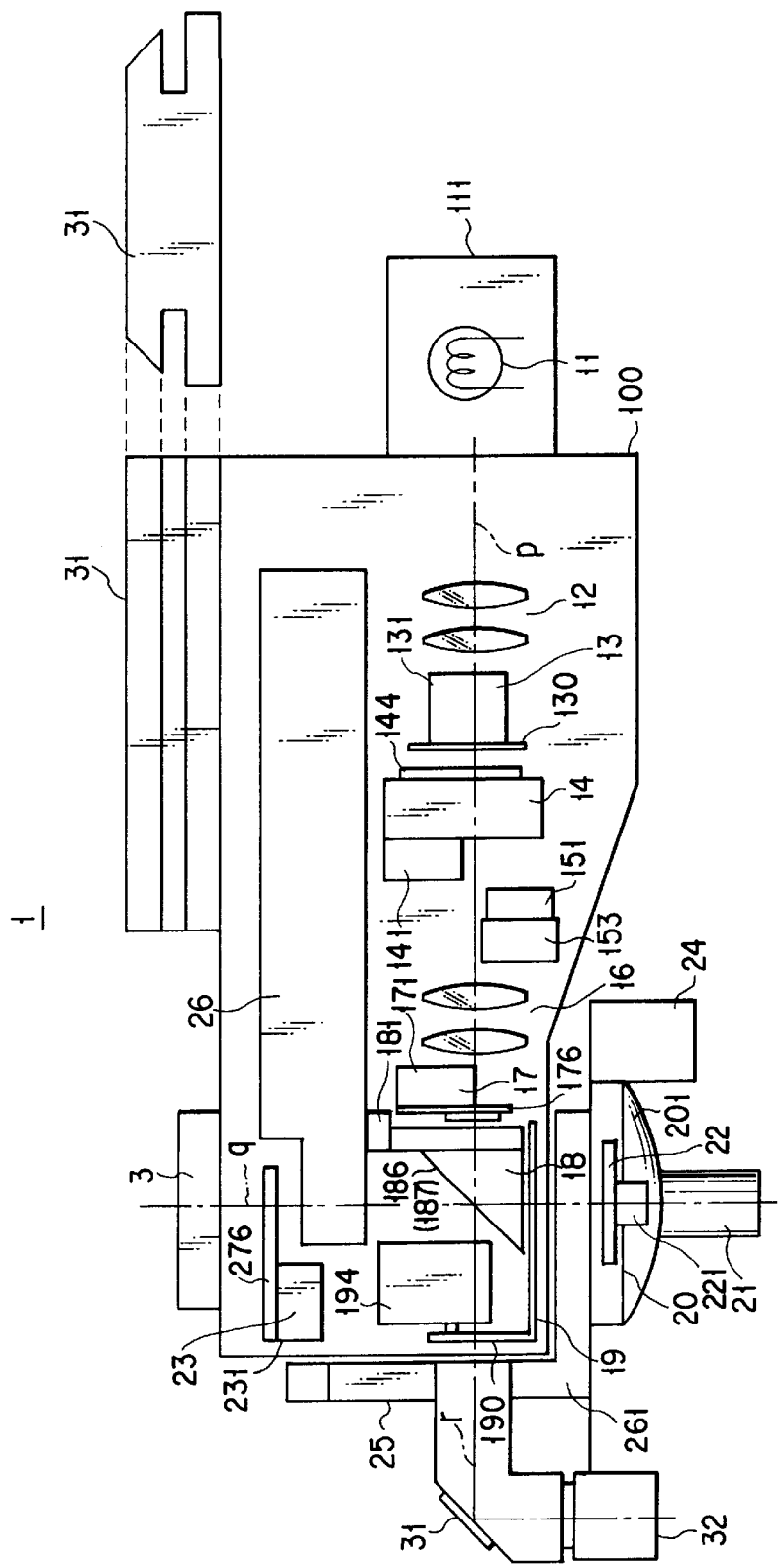
FIG. 3B is a sectional view showing the configuration of the microscope unit according to the embodiment of the present invention.
Figure 3C:
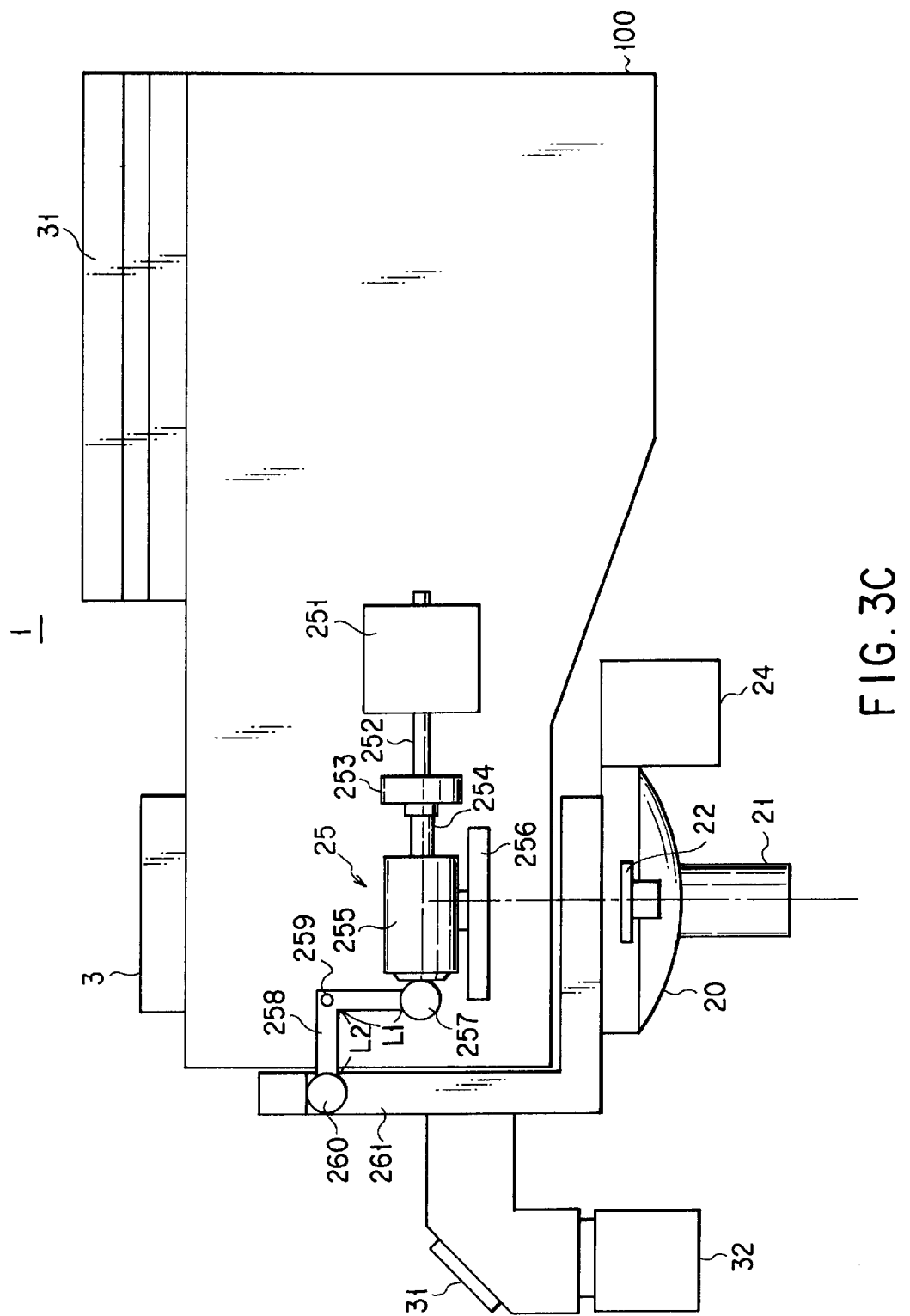
FIG. 3C is a side view showing the configuration of the microscope unit according to the embodiment of the present invention.

FIG. 2 is a diagram showing a configuration of the microscope unit according to the first embodiment. In the microscope unit 1, an optical unit constituting a lighting system and an observation optical system for various microscopic methods (observation methods) is integrally mounted on a microscope observation tube 100 as shown in FIGS. 3A, 3B, and 3C. The microscope unit 1 is connected to an operation section (hand switch section) 2. Moreover, the microscope observation tube unit 100 includes a revolver 20 to which a plurality of objective lenses 21 are attached. Furthermore, a CCD camera 4 is attached to an attachment portion 3 of an upper surface of the microscope tube 100, and the CCD camera 4 is connected to a monitor television 5.

FIGS. 3A to 3C are diagrams showing a concrete configuration of the microscope unit 1, FIG. 3A is a top plan view, FIG. 3B is a sectional view taken along a lighting optical axis, and FIG. 3C is a side view. A controller 10 constituting an operation control unit for operating/controlling the microscope unit 1 is disposed on one side surface of the microscope observation tube 100. Moreover, a lamp house 111, in which a light source 11 for lighting is incorporated, is disposed on a back surface of the microscope observation tube 100. The controller 10 is connected to the operation section 2 shown in FIG. 2.

Disposed on or in the vicinity of a lighting optical path p of the light source in the microscope observation tube 100 for lighting (hereinafter referred to as the lamp) 11 are a lens system 12, an ND filter 130 and an adjustment section thereof hereinafter referred to as the ND filter adjustment section) 13, an aperture stop 144 and an adjustment section thereof hereinafter referred to as the AS adjustment section) 14, a field stop 153 and an adjustment section thereof (hereinafter referred to as the FS adjustment section) 15, a lens system 16, a direct acting member 176 having polarizers for polarization observation and differential interference observation incorporated therein and an attachment/detachment section thereof (hereinafter referred to as the polarizer attachment/detachment section) 17, a switching section hereinafter referred to as the bright field/dark field switching section) 18 of a bright field cube 186 and a dark field cube 187, a shutter 190 and a switching section thereof (hereinafter referred to as the shutter switching section) 19, and a mirror 31.

The ND filter adjustment section 13, AS adjustment section 14, FS adjustment section 15, polarizer attachment/detachment section 17, bright field/dark field switching section 18, and shutter switching section 19 individually include electromotive actuators 131, 141, 151, 171, 181, 194 such as a pulse motor, stepping motor, and solenoid. In a shown example, the pulse motor is used as the electromotive actuator, and in the example these pulse motors 131, 141, 151, 171, 181, 194 are connected to the controller 10.

The ND filter 130 is driven by the pulse motor 131 in the ND filter adjustment section 13. The aperture stop 144 is driven by the pulse motor 141 in the AS adjustment section 14. The field stop 153 is driven by the pulse motor 151 in the FS adjustment section 15. The polarizer is driven by the pulse motor 171 in the polarizer attachment/detachment portion 17. Switching of the bright field cube 186 and dark field cube 187 is driven by the pulse motor 181 in the bright field/dark field switching portion 18. The shutter 190 is driven by the pulse motor 194 in the shutter switching portion 19.

Moreover, disposed on or in the vicinity of a main observation optical path q are the objective lens 21 attached to the electromotive revolver 20, a direct acting member in which a Nomarski prism 224 for the differential interference observation is incorporated and an adjustment portion thereof (hereinafter referred to as the Nomarski adjustment section) 22, the bright field/dark field switching section 18, and a direct acting member 276 in which analyzers for the polarization observation and differential interference observation are incorporated and an attachment/detachment section thereof (hereinafter referred to as the analyzer attachment/detachment section) 23. Additionally, the Nomarski adjustment section 22 is attached to the revolver 20.

The Nomarski adjustment section 22 and analyzer attachment/detachment section 23 individually include pulse motors 221, 231. These pulse motors 221, 231 are connected to the controller 10. The Nomarski prism 224 is driven by the pulse motor 221 in the Nomarski adjustment section 22. The attachment/detachment of the analyzer is driven by the pulse motor 231 in the analyzer attachment/detachment section 23.

Moreover, the electromotive revolver 20 rotates/drives a rotating member 201 to which a plurality of objective lenses 21 are attached, and includes a revolver driver 24 for positioning the desired objective lens 21 on the main observation optical path q. Additionally, a plurality of objective lenses 21 having different magnifications can be attached to the electromotive revolver 20. Furthermore, the microscope observation tube 100 includes a focusing driver 25 for moving the electromotive revolver 20 on the main observation optical path q in a direction of an observation optical path (direction of the main observation optical path q), and an auto focus controller 26 for controlling the focusing driver 25.

The mirror 31 and an objective lens (macro objective lens) 32 having a low magnification (e.g., 3 times) are disposed on a sub observation optical path r. The mirror 31 bends the sub observation optical path r at right angles, and allows the optical axis of the objective lens 32 to extend in parallel to the optical axis of the objective lens 21. Moreover, the objective lens 32 is attached to a tip end of a sub observation tube via a screw, and can move in an optical axis direction with the movement of the focusing driver 25. That is, the objective lens 32 cooperates with the objective lens 21 by the focusing driver 25 and can move in the optical axis direction, and further the objective lens 21 and objective lens 32 can simultaneously be focused by the movement.

The attachment section 3 is disposed on the main observation optical path q in the upper surface of the microscope observation tube 100. Image pickup apparatuses such as the CCD camera 4 and eyepiece observation tubes are attached to the attachment section 3. As shown in FIG. 3B, a dovetail 31 is disposed on the upper surface of the microscope observation tube 100. Additionally in FIG. 3B, a front view of the dovetail 31 is shown on the right side. The microscope observation tube 100 is supported by the microscope unit support 105, when the dovetail 31 engages in a dovetail groove formed in the microscope unit support 105. Additionally, the dovetail 31 can be disposed on surfaces other than the upper surface of the microscope observation tube 100, such as a back surface thereof, in accordance with a structure of the microscope unit support of various test apparatuses.

A function of the optical unit incorporated in the microscope observation tube 100 will be described hereinafter. For example, a white light source is used in the lamp 11. The ND filter adjustment section 13 has the ND filter 130 for decreasing an intensity of a light without changing the relative spectral distribution of the energy, and has a function for adjusting a decrease degree of the intensity of the light. The AS adjustment section 14 has the aperture stop (AS) 144, and has a function for adjusting the aperture stop 144, and forming a sharp and clear edge with respect to the field. The FS adjustment section 15 has the field stop (FS) 153, and has a function for adjusting the field stop 153 and changing a quantity of the light and a conical angle of the light incident upon the objective lens 21.

The polarizer attachment/detachment section 17 has a polarizer, and has a function for inserting the polarizer onto the lighting optical path p, when the microscope unit 1 is constituted as the optical system of the polarization observation or the differential interference observation. The bright field/dark field switching section 18 has the bright field cube 186 in which the optical system for bright field lighting is contained, and the dark field cube 187 in which the optical system for dark field lighting is contained. The section has a function for inserting/detaching these cubes 186, 187 into/from intersections of the lighting optical path p and observation optical paths q, r and switching the bright field lighting and dark field lighting. The shutter switching section 19 has a function for selectively shielding the main observation optical path q and sub observation optical path r by the shutter 190 described later.

The rotating member 201 is rotatably disposed in the revolver 20, and the plurality of objective lenses 21 having respective different magnifications are attached to the rotating member 201. Moreover, the revolver 20 is attached to the focusing driver 25, and moved in the direction of the observation optical axis q with respect to the microscope observation tube 100 and focused. The revolver driver 24 has a function for rotating the rotating member 201 of the revolver 20, and switching and disposing one objective lens 21 having a desired magnification on the observation optical axis among the plurality of objective lenses 21 attached to the revolver 20. The focusing driver 25 has a function for moving a focusing slider 261 with the revolver 20 attached thereto in the direction of the observation optical axis. The auto focus controller 26 has a function for controlling the focusing driver 25, moving the focusing slider 261 in the direction of the observation optical axis q with respect to the microscope observation tube 100, and performing automatic focusing with respect to the substrate to be tested 103.

The Nomarski adjustment section 22 has a direct acting member 225 in which the Nomarski prism is incorporated, and has a function for inserting the direct acting member 225 onto the main observation optical path q and adjusting lateral deviation when the microscope unit 1 is constituted as the optical system for differential interference observation. The analyzer attachment/detachment section 23 has a direct acting member 236 in which the analyzer is incorporated, and has a function for inserting the direct acting member 236 onto the main observation optical path q when the microscope unit 1 is constituted as the optical system for polarization observation or differential interference observation.

The controller 10 has respective functions for following the operation instructions input to the operation section 2 by an operator, and performing control of the light quantity of the lamp 11, adjustment control of the ND filter 130 by the ND filter adjustment section 13, adjustment control of the aperture stop 144 by the AS adjustment section 14, adjustment control of the field stop 153 by the FS adjustment section 15, attachment/detachment control of the polarizer by the polarizer attachment/detachment section 17, switching control of the bright field cube 186 and dark field cube 187 by the bright field/dark field switching section 18, switching control of the shutter 190 by the shutter switching section 19, attachment/detachment of the Nomarski prism and adjustment control of lateral deviation by the Nomarski adjustment section 22, attachment/detachment control of the analyzer by the analyzer attachment/detachment section 23, rotation control of the revolver 20 by the revolver driver 24, movement control of the focusing slider 261 in the observation optical axis direction by the focusing driver 25, and control instruction to the auto focus controller 26.

Figure 4A:
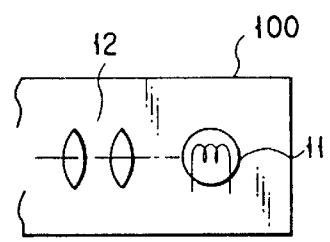
FIGS. 4A, 4B are diagrams showing modification examples of a layout of a lamp with respect to the microscope unit according to the embodiment of the present invention.
Figure 4B:
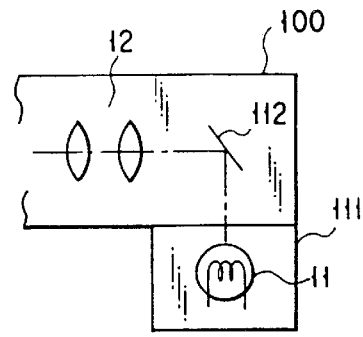

FIGS. 4A, 4B are diagrams showing modification examples of a layout of the lamp 11 with respect to the microscope observation tube 100. As shown in FIG. 4A, the lamp 11 may be disposed in the main body of the microscope observation tube 100. Moreover, as shown in FIG. 4B, the lamp house 111 is disposed on the side surface of the microscope observation tube 100, and a mirror 112 is disposed in the microscope observation tube 100, so that the illumination light emitted from the lamp 11 may be deflected by the mirror 112 and be incident upon the lens system 12. The lamp 11 can be attached to an appropriate place for the convenience of the layout with other mechanisms in this manner.

Basic mechanisms of the optical units incorporated in microscope observation tube will be described hereinafter.

Figure 5:
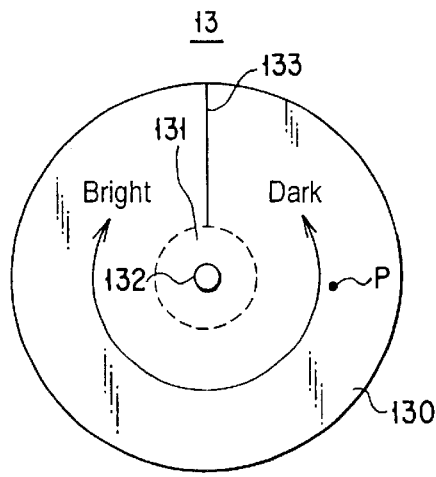
FIG. 5 is a basic mechanism diagram of a neutral density filter adjustment section according to the embodiment of the present invention.

FIG. 5 is a basic mechanism diagram of the ND filter adjustment section 13. A center portion of the ND filter 130 having a disc shape is attached to a rotation shaft 132 of the pulse motor 131. The ND filter 130 is disposed so as to cross at right angles to the lighting optical path p. For the ND filter 130, a density becomes highest in the vicinity of the right side of a boundary 133, continuously decreases in a clockwise direction, and is lowest in the vicinity of the left side of the boundary 133. The ND filter 130 rotates in a counterclockwise direction as facing the drawing, when the pulse motor 131 rotates forwards. In this case, since the density of the ND filter 130 on the lighting optical path p gradually decreases, the light quantity of transmitted illumination light gradually increases. Moreover, the ND filter 130 rotates in the clockwise direction as facing the drawing, when the pulse motor 131 rotates backwards. In this case, since the density of the ND filter 130 on the lighting optical path p gradually increases, the light quantity of transmitted illumination light gradually decreases. Additionally, the controller 10 controls rotating/driving of the pulse motor 131 so that the boundary 133 does not extend across the lighting optical path p with the rotation of the ND filter 130. That is, the controller 10 controls the light quantity of transmitted illumination light so that the quantity constantly gradually changes without rapidly changing during the rotation of the ND filter 130.

Figure 6:
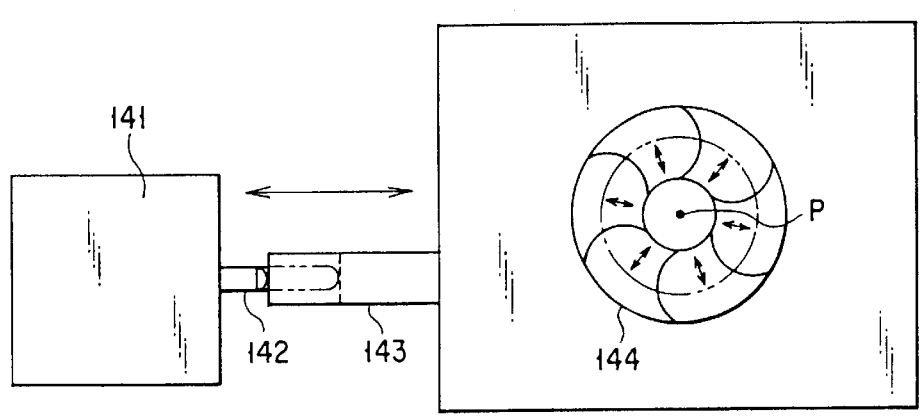
FIG. 6 is a basic mechanism diagram of an aperture stop adjustment section according to the embodiment of the present invention.

FIG. 6 is a basic mechanism diagram of the AS adjustment section 14. A direct acting member 143 which moves straight is attached to a shaft 142 of the pulse motor 141 of a straight moving type. The direct acting member 143 meshes with the aperture stop 144 on the lighting optical path p. When the controller 10 drives/controls the pulse motor 141, the direct acting member 143 moves in one direction, and the aperture stop 144 gradually opens. When the direct acting member 143 moves in the other direction, the aperture stop 144 gradually closes.

Figure 7:
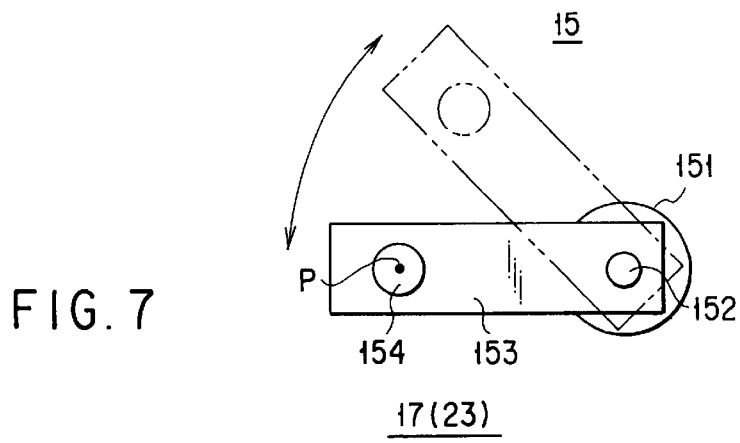
FIG. 7 is a basic mechanism diagram of a field stop adjustment section according to the embodiment of the present invention.

FIG. 7 is a basic mechanism diagram of the FS adjustment section 15. One end of the field stop 153 having a flat plate shape is attached to a rotation shaft 152 of the pulse motor 151. An aperture 154 with a predetermined diameter is formed in the other end of the field stop 153. When the controller 10 controls the rotating/driving of the pulse motor 151, the aperture 154 of the field stop 153 attached to the rotation shaft 152 is inserted/detached with respect to the lighting optical path p.

When the pulse motor 151 rotates forwards by the rotating/driving control of the controller 10, the field stop 153 rotates in the counterclockwise direction as facing the drawing. Thereby, the aperture 154 is inserted onto the lighting optical path p. Moreover, when the pulse motor 151 rotates backwards by the rotating/driving control of the controller 10, the field stop 153 rotates in the clockwise direction as facing the drawing. Thereby, the aperture 154 is detached from the lighting optical path p.

Figure 8:
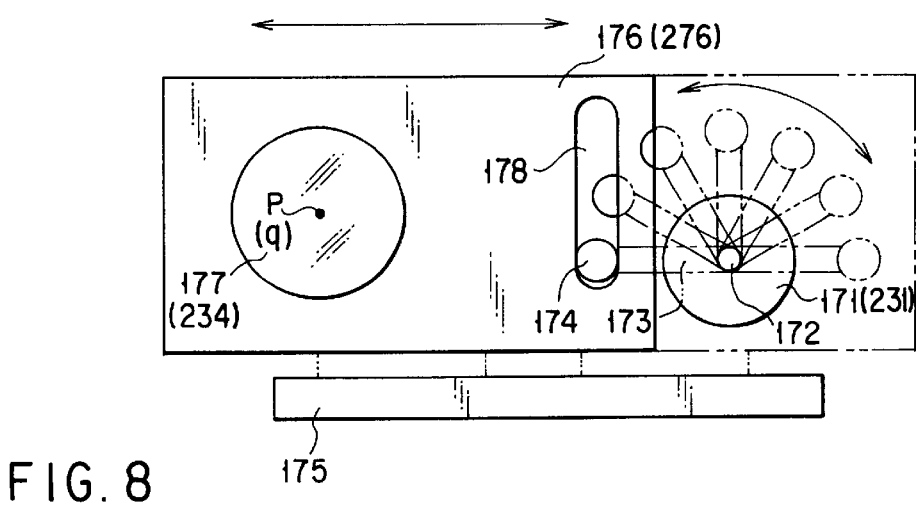
FIG. 8 is a basic mechanism diagram of a polarizer attachment/detachment section according to the embodiment of the present invention.

FIG. 8 is a basic mechanism diagram of the polarizer attachment/detachment section 17. One end of an arm 173 is attached to a rotation shaft 172 of the pulse motor 171 so as to cross at right angles to the rotation shaft 172. A columnar guide member 174 is attached to the other end of the arm 173 in parallel to the rotation shaft 172. Moreover, the direct acting member 176 which moves straight is disposed on a direct acting guide member 175. A polarizer 177 is disposed on the direct acting member 176 so as to cross at right angles to the lighting optical path p. Moreover, an elongated hole 178 is formed in the direct acting member 176 in a longitudinal direction, and the guide member 174 disposed on the arm 173 is passed through the elongated hole 178.

When the controller 10 controls the rotating/driving of the pulse motor 171, the guide member 174 rotates around the rotation shaft 172 via the rotation shaft 172 and arm 173. With the rotation, the guide member 174 moves upwards or downwards in the elongated hole 178, while allowing the direct acting member 176 to move straight along the direct acting guide member 175.

When the pulse motor 171 rotates forwards by the rotating/driving control of the controller 10, the guide member 174 rotates in the counterclockwise direction as facing the drawing. In this case, the direct acting member 176 is moved leftwards, and the polarizer 177 is inserted onto the lighting optical path p. Moreover, when the pulse motor 171 rotates backwards by the rotating/driving control of the controller 10, the guide member 174 rotates in the clockwise direction as facing the drawing. In this case, the direct acting member 176 is moved rightwards, and the polarizer 177 is detached from the lighting optical path p.

Figure 9:
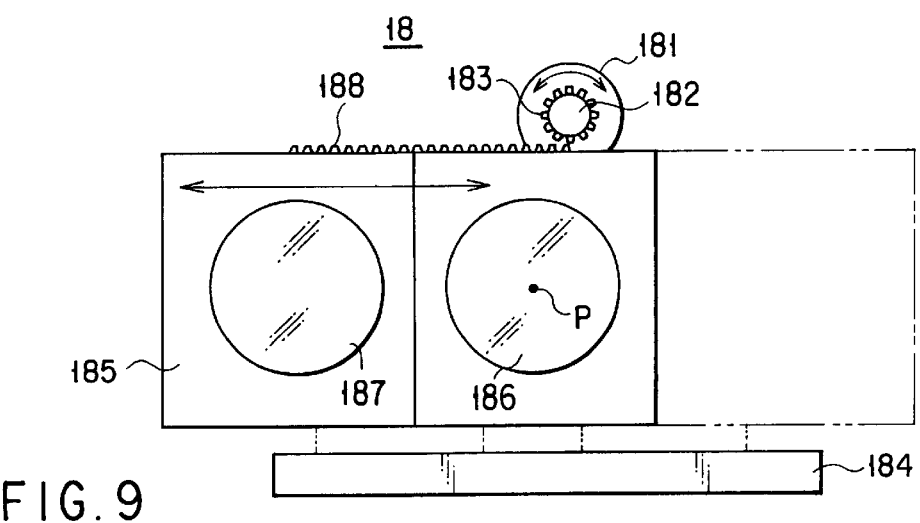
FIG. 9 is a basic mechanism diagram of a bright field/dark field switching section according to the embodiment of the present invention.

FIG. 9 is a basic mechanism diagram of the bright field/dark field switching section 18. A pinion 183 is disposed around a rotation shaft 182 of the pulse motor 181. Moreover, a direct acting member 185 which moves straight is disposed on a direct acting guide member 184. The bright field cube 186 and dark field cube 187 are aligned and disposed in the direct acting member 185. A rack 188 is disposed on an upper portion of the direct acting member 185, and the rack 188 meshes with the pinion 183.

When the pinion 183 arranged around the rotation shaft 182 rotates by the rotating/driving control of the pulse motor 181 by the controller 10, the direct acting member 185 moves straight along the direct acting guide member 184 via the rack 188.

When the pulse motor 181 rotates forwards by the rotating/driving control of the controller 10, the pinion 183 rotates in the counterclockwise direction as facing the drawing. In this case, the direct acting member 185 is moved rightwards, and the dark field cube 187 is inserted onto the lighting optical path p. Moreover, when the pulse motor 181 rotates backwards by the rotating/driving control of the controller 10, the pinion 183 rotates in the clockwise direction as facing the drawing. In this case, the direct acting member 185 is moved leftwards, and the bright field cube 186 is inserted onto the lighting optical path p.

Figure 10:
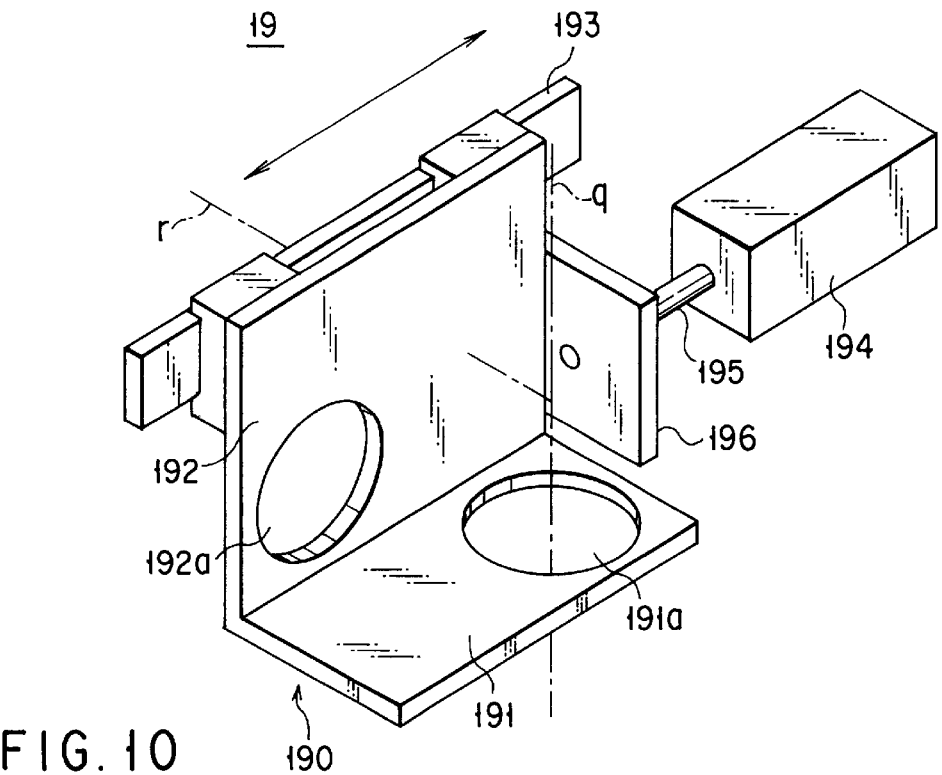
FIG. 10 is a basic mechanism diagram of a shutter switching section according to the embodiment of the present invention.

FIG. 10 is a basic mechanism diagram of the shutter switching portion 19. The shutter switching section 19 is disposed in the vicinity of the bright field/dark field switching section 18. The shutter 190 is formed in an L shape by a pair of rectangular shielding plates 191, 192. A through hole 191a is formed in the shielding plate 191, and a through hole 192a is formed in the shielding plate 192. A holding member 196 is attached to a shaft 195 of the pulse motor 194 of the straight moving type, and a side portion of the shielding plate 192 is attached to the holding member 196. A guide member 193 for guiding the shutter 190 in the longitudinal direction is disposed in the vicinity of the shielding plate 192.

When the controller 10 drives/controls the pulse motor 194, the shutter 190 moves straight along the guide 193 via the shaft 195 and holding member 196. Thereby, the through hole 191a can selectively be disposed on the main observation optical path q, or the through hole 132a can selectively be disposed on the sub observation optical path r.

Figure 11:
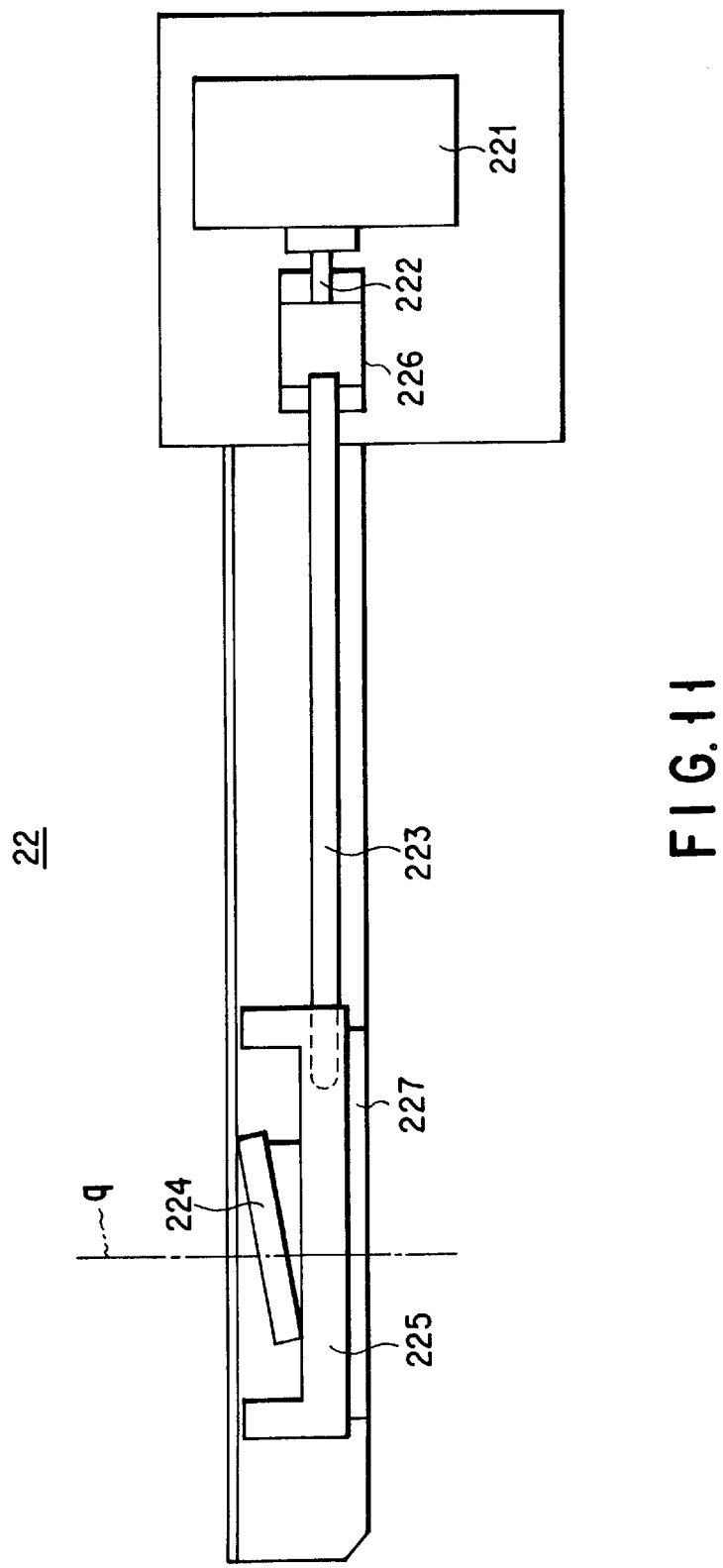
FIG. 11 is a basic configuration diagram of a Nomarski adjustment portion according to the embodiment of the present invention.

FIG. 11 is a basic configuration diagram of the Nomarski adjustment section 22. A ball screw 223 is attached to a rotation shaft 222 of the pulse motor 221 via a support unit 226. A direct acting member 225 which moves linearly is disposed on a direct acting guide member 227, and the ball screw 223 meshes with the direct acting member 225. A Nomarski prism 224 is disposed on the direct acting member 225.

When the pulse motor 221 rotates forwards (or rotates backwards) by the rotating/driving control of the controller 10, the ball screw 223 rotates forwards (or rotates backwards) via the rotation shaft 222. Accordingly, the direct acting member 225 moves forwards (or backwards) on the direct acting guide member 227. Thereby, the Nomarski prism 224 is inserted onto (or removed from) the main observation optical path q, and the lateral deviation is adjusted.

The basic mechanism of the analyzer attachment/detachment section 23 is similar to that shown in FIG. 8. An analyzer 234 is disposed on the direct acting member 276 in the analyzer attachment/detachment section 23. Moreover, the analyzer 234 is inserted/detached with respect to the main observation optical path q by the rotating/driving control of the pulse motor 231 by the controller 10.

The basic mechanism of the focusing driver 25 is shown in FIG. 3C. A ball screw 254 is attached to a rotation shaft 252 of the pulse motor 251 via a support unit 253. A direct acting member 255 which moves linearly is disposed on a direct acting guide member 256, and the ball screw 254 engages with the direct acting member 255. An L-shaped link member 258 is connected to the direct acting member 255 via a bearing 257, and an L-shaped focusing slider 261 is connected to the link member 258 via a bearing 260. Additionally, a bent portion of the link member 258 is supported by a support shaft 259. The focusing slider 261 is disposed such that the slider can slide in a vertical direction with respect to a direct acting guide member (not shown) disposed on the front surface of the microscope observation tube 100. The revolver 20 is attached to the lower portion of the focusing slider 261.

When the pulse motor 251 rotates forwards by the rotating/driving control of the controller 10, the ball screw 254 rotates forwards via the rotation shaft 252. Accordingly, the direct acting member 255 moves forwards (leftwards in FIG. 3C) on the direct acting guide member 256, and therefore the link member 258 rotates around the support shaft 259 via the bearing 257. Thereby, the focusing slider 261 is moved upwards (in a direction away from a sample) via the bearing 260. Moreover, when the pulse motor 251 rotates backwards by the rotating/driving control of the controller 10, the ball screw 254 rotates backwards via the rotation shaft 252. Accordingly, the direct acting member 255 moves backwards (rightwards in FIG. 3C) on the direct acting guide member 256, and therefore the link member 258 rotates around the support shaft 259 via the bearing 257. Thereby, since the focusing slider 261 is moved downwards, the revolver 20 is moved downwards (in a direction toward the sample).

Additionally, in an initial state, the focusing slider 261 is hung by its own weight, and the objective lens 21 is constantly set not to collide with the sample. Moreover, when a length L1 in the L-shaped link member 258 is set to be larger than a length L2, a resolution for vertically moving the revolver 20 (focusing slider 261) is enhanced. Conversely, when the length L2 in the L-shaped link member 258 is set to be larger than the length L1, a speed for vertically moving the revolver 20 (focusing slider 261) is raised.

Additionally, the motor is used as a power source of each aforementioned basic mechanism, but other actuators or piezoelectric devices may also be used. Moreover, each movable object is directly attached to the shaft of the motor in FIGS. 5, 7, 9, 10, but a speed reduction mechanism, and the like may be disposed between the movable object and the shaft of the motor. Furthermore, each aforementioned basic mechanism can also be used for driving any aforementioned movable object. For example, the basic mechanism of FIG. 9 can also be used in the polarizer attachment/detachment section 17 or the Nomarski adjustment section 22.

Figure 12:
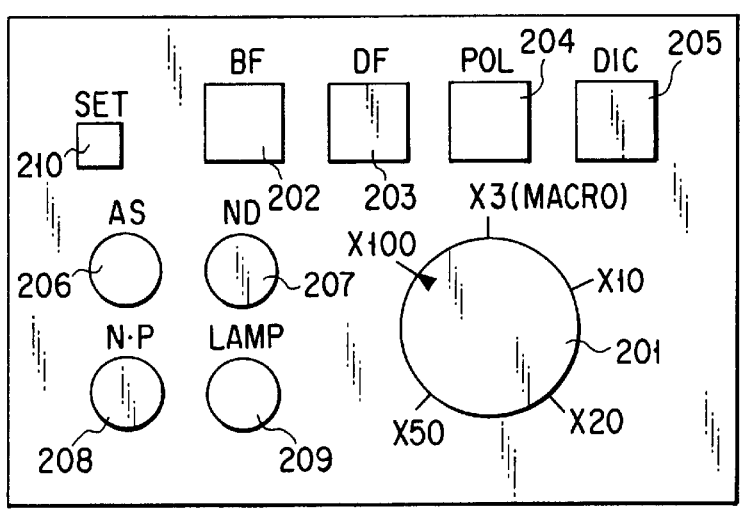
FIG. 12 is a diagram showing a configuration of an operation section according to the embodiment of the present invention.

FIG. 12 is a diagram showing a configuration of the operation section 2. In the operation section 2, a magnification dial 201, a bright field observation switch (hereinafter referred to as the BF switch) 202, a dark field observation switch (hereinafter referred to as the DF switch) 203, a polarization observation switch (hereinafter referred to as the POL switch) 204, a differential interference observation switch (hereinafter referred to as the DIC switch) 205, an aperture stop adjustment dial (hereinafter referred to as the AS dial) 206, an ND filter adjustment dial (hereinafter referred to as the ND dial) 207, a Nomarski adjustment dial (hereinafter referred to as the N·P dial) 208, a light quantity adjustment dial 209, and a setting switch 210 are disposed on a panel.

An operation of the microscope unit 1 configured as described above will be described hereinafter with reference to FIGS. 13, 14, and the like. Additionally, respective tables shown in FIGS. 13, 14 are stored in the controller 10.

FIGS. 13, 14 are diagrams showing states of respective optical units incorporated in the microscope observation tube 100 for the microscopic method (observation method). FIG. 13 shows a case in which only an incident lighting (a fall lighting) is performed. FIG. 14 shows a case in which the incident lighting and a transmission lighting are performed.

When the bright field observation is carried out with the microscope unit 1, the operator turns ON the BF switch 202 of the operation section 12. Additionally, a bright field observation method is a general microscopic method of a microscope.

When the controller 10 of the microscope unit 1 detects that the BF switch 202 is turned ON, first the controller instructs each optical unit to carry out an operation for the bright field observation shown in a column a1 of FIG. 13. Thereby, the bright field/dark field switching section 18 inserts the bright field cube 186 onto the lighting optical path p. The polarizer attachment/detachment section 17 detaches the polarizer 177 from the lighting optical path p. The FS adjustment section 15 detaches the field stop 153 from the lighting optical path p. The AS adjustment section 14 sets a diameter of the aperture stop 144 to be the same as the previous diameter. The ND filter adjustment section 13 sets a position of the ND filter 130 on the lighting optical path p to be the same as the previous position. The analyzer attachment/detachment section 23 detaches the analyzer 234 from the main observation optical path q. The Nomarski adjustment section 22 detaches the Nomarski prism 224 from the main observation optical path q. The shutter switching section 19 shields the sub observation optical path r by the shielding plate 192, and disposes the through hole 191a on the main observation optical path q. Thereafter, the controller 10 instructs the auto focus controller 26 to focus the substrate to be tested 103 as the sample. Moreover, a focusing operation of the focusing driver 25 is carried out by the control of the auto focus controller 26.

When the bright field observation is carried out by the aforementioned setting, the illumination light emitted from the lamp 11 is passed through the lens system 12, ND filter 130, aperture stop (AS) 144, and lens system 16, and is incident upon the bright field cube 186, and the substrate to be tested 103 as the sample is irradiated with the light passed through the bright field cube 186 and objective lens 21. The light from the substrate to be tested 103 is again transmitted through the objective lens 21 and bright field cube 186 and is incident upon the CCD camera 4. The CCD camera 4 picks up an image of the sample, and transmits an image signal to the monitor television 5. The monitor television 5 processes the image signal from the CCD camera 4 into the image and displays the sample image.

When the dark field observation is performed with the microscope unit 1, the operator turns ON the DF switch 203 of the operation section 2. Additionally, the dark field observation method is a microscopic method of irradiating the sample with a large hollow conical light having an angle larger than an acceptance angle of the objective lens, the sample can be observed only with a scattering light, and even a slight irregularity of a sample surface can be distinguished.

When the controller 10 of the microscope unit 1 detects that the DF switch 203 is turned ON, first the controller instructs each optical unit to carry out an operation for the dark field observation shown in a column a2 of FIG. 13. Thereby, the bright field/dark field switching section 18 inserts the dark field cube 187 onto the lighting optical path p. The polarizer attachment/detachment section 17 detaches the polarizer 177 from the lighting optical path p. The FS adjustment section 15 detaches the field stop 153 from the lighting optical path p. The AS adjustment section 14 opens the aperture stop 144. The ND filter adjustment section 13 sets the position of the ND filter 130 on the lighting optical path p to be the same as the previous position. The analyzer attachment/detachment section 23 detaches the analyzer 234 from the main observation optical path q. The Nomarski adjustment section 22 detaches the Nomarski prism 224 from the main observation optical path q. The shutter switching section 19 shields the sub observation optical path r by the shielding plate 192, and disposes the through hole 191a on the main observation optical path q. Thereafter, the controller 10 instructs the auto focus controller 26 to focus the substrate to be tested 103 as the sample. Moreover, the focusing operation of the focusing driver 25 is carried out by the control of the auto focus controller 26.

When the dark field observation is carried out by the aforementioned setting, the illumination light emitted from the lamp 11 is passed through the lens system 12, ND filter 130, aperture stop (AS) 144, and lens system 16, and is incident upon the dark field cube 187, and the substrate to be tested 103 as the sample is irradiated with the light passed through the dark field cube 187 and objective lens 21. The light from the substrate to be tested 103 is again transmitted through the objective lens 21 and dark field cube 187 and is incident upon the CCD camera 4. The CCD camera 4 picks up the sample image, and transmits the image signal to the monitor television 5. The monitor television 5 processes the image signal from the CCD camera 4 into the image and displays the sample image.

When the polarization observation is performed with the microscope unit 1, the operator turns ON the POL switch 204 of the operation section 12. Additionally, the polarization observation method is a microscopic method for observing the sample with a polarized light.

When the controller 10 of the microscope unit 1 detects that the POL switch 204 is turned ON, first the controller instructs each optical unit to carry out an operation for the polarization observation shown in a column a3 of FIG. 13. Thereby, the bright field/dark field switching section 18 inserts the bright field cube 186 onto the lighting optical path p. The polarizer attachment/detachment section 17 inserts the polarizer 177 onto the lighting optical path p. The FS adjustment section 15 detaches the field stop 153 from the lighting optical path p. The AS adjustment section 14 sets the diameter of the aperture stop 144 to be the same as the previous diameter. The ND filter adjustment section 13 sets the position of the ND filter 130 on the lighting optical path p to be the same as the previous position. The analyzer attachment/detachment section 23 inserts the analyzer 234 onto the main observation optical path q. The Nomarski adjustment section 22 detaches the Nomarski prism 224 from the main observation optical path q. The shutter switching section 19 shields the sub observation optical path r by the shielding plate 192, and disposes the through hole 191a on the main observation optical path q. Thereafter, the controller 10 instructs the auto focus controller 26 to focus the substrate to be tested 103 as the sample. Moreover, the focusing operation of the focusing driver 25 is carried out by the control of the auto focus controller 26.

When the polarization observation is carried out by the aforementioned setting, the illumination light emitted from the lamp 11 is passed through the lens system 12, ND filter 130, aperture stop (AS) 144, lens system 16, and polarizer 177, and is incident upon the bright field cube 186, and the substrate to be tested 103 as the sample is irradiated with the light passed through the bright field cube 186 and objective lens 21. The light from the substrate to be tested 103 is again transmitted through the objective lens 21, bright field cube 186, and analyzer 234, and is incident upon the CCD camera 4. The CCD camera 4 picks up the sample image, and transmits the image signal to the monitor television 5. The monitor television 5 processes the image signal from the CCD camera 4 into the image and displays the sample image.

When the differential interference observation is performed with the microscope unit 1, the operator turns ON the DIC switch 205 of the operation section 12. Additionally, the differential interference observation method is a microscopic method comprising: transmitting two light waves slightly deviating laterally through the sample; allowing interference by a deformed wave corresponding to a phase difference corresponding to a difference of a refractive index between the waves; and changing the wave to contrasts of color and visualizing a phase distribution.

When the controller 10 of the microscope unit 1 detects that the DIC switch 205 is turned ON, first the controller instructs each optical unit to carry out an operation for the differential interference observation shown in a column a4 of FIG. 13. Thereby, the bright field/dark field switching section 18 inserts the bright field cube 186 onto the lighting optical path p. The polarizer attachment/detachment section 17 inserts the polarizer 177 onto the lighting optical path p. The FS adjustment section 15 detaches the field stop 153 from the lighting optical path p. The AS adjustment section 14 sets the diameter of the aperture stop 144 to be the same as the previous diameter. The ND filter adjustment section 13 sets the position of the ND filter 130 on the lighting optical path p to be the same as the previous position. The analyzer attachment/detachment section 23 inserts the analyzer 234 onto the main observation optical path q. The Nomarski adjustment section 22 inserts the Nomarski prism 224 onto the main observation optical path q, and adjusts the lateral deviation to bring the prism into the same position as the previous position. The shutter switching section 19 shields the sub observation optical path r by the shielding plate 192, and disposes the through hole 191a on the main observation optical path q. Thereafter, the controller 10 instructs the auto focus controller 26 to focus the substrate to be tested 103 as the sample. Moreover, the focusing operation of the focusing driver 25 is carried out by the control of the auto focus controller 26.

When the differential interference observation is carried out by the aforementioned setting, the illumination light emitted from the lamp 11 is passed through the lens system 12, ND filter 130, aperture stop (AS) 144, lens system 16, and polarizer 177, and is incident upon the bright field cube 186, and the substrate to be tested 103 as the sample is irradiated with the light passed through the bright field cube 186, Nomarski prism 224, and objective lens 21. The light from the substrate to be tested 103 is again transmitted through the objective lens 21, Nomarski prism 224, bright field cube 186, and analyzer 234, and is incident upon the CCD camera 4. The CCD camera 4 picks up the sample image, and transmits the image signal to the monitor television 5. The monitor television 5 processes the image signal from the CCD camera 4 into the image and displays the sample image.

When a macro spot observation is performed with the microscope unit 1, the operator sets the magnification dial 201 of the operation section 12 to "x3 (MACRO)". In the macro spot observation, the low-magnification objective lens 32 is used to observe the sample in a broad range. Additionally, an observation using the respective objective lenses 21 attached to the revolver 20 (respective magnifications are 10, 20, 50, 100 times) is referred to as micro observation.

When the controller 10 of the microscope unit 1 detects that the magnification dial 201 is set to "x3 (MACRO)", first the controller instructs each optical unit to carry out an operation for the macro spot observation shown in a column a5 of FIG. 13. Thereby, the bright field/dark field switching portion 18 inserts the bright field cube 186 onto the lighting optical path p. The polarizer attachment/detachment portion 17 detaches the polarizer 177 from the lighting optical path p. The FS adjustment section 15 inserts the field stop 153 onto the lighting optical path p. The AS adjustment section 14 sets the diameter of the aperture stop 144 to be the same as the previous diameter. The ND filter adjustment section 13 sets the position of the ND filter 130 on the lighting optical path p to be the same as the previous position. The analyzer attachment/detachment section 23 detaches the analyzer 234 from the main observation optical path q. The Nomarski adjustment section 22 detaches the Nomarski prism 224 from the main observation optical path q. The shutter switching section 19 shields the main observation optical path g by the shielding plate 191, and disposes the through hole 192a on the sub observation optical path r. Thereafter, the controller 10 instructs the auto focus controller 26 to focus the substrate to be tested 103 as the sample. Moreover, the focusing operation of the focusing driver 25 is carried out by the control of the auto focus controller 26.

When the macro spot observation is carried out by the aforementioned setting, the illumination light emitted from the lamp 11 is transmitted through the lens system 12, ND filter 130, aperture stop 144, field stop 153, lens system 16, and bright field cube 186, and is reflected by the mirror 31, and the substrate to be tested 103 as the sample is irradiated with the light passed through the objective lens 32. The light from the substrate to be tested 103 is again transmitted through the objective lens 32 and reflected by the mirror 31, incident upon the bright field cube 186, and incident upon the CCD camera 4 from the bright field cube 186. The CCD camera 4 picks up the sample image, and transmits the image signal to the monitor television 5. The monitor television 5 processes the image signal from the CCD camera 4 into the image and displays the sample image.

The operation for subjecting the sample to the incident lighting has been described above, but as described later in a second embodiment, the observation by the transmission lighting can also be performed while a light source for the transmission lighting is disposed below the sample (on the optical axis of the objective lens 21 or 32). In this case, the operator turns ON a transmission lighting observation switch (not shown) of the operation section 2. The controller 10 instructs each optical unit to perform the operation for the microscopic method as shown in columns b1 to b5 of FIG. 14. A voltage value of the light source for the transmission lighting is set to be the same as the previous value by the controller.

Additionally, the "previous position" in FIGS. 13, 14 indicates the state of the optical unit during the previous observation with the same microscopic method. For example, it is assumed that the diameter of the aperture stop 144 is adjusted and the bright field observation is performed, thereafter the differential interference observation is performed, and the bright field observation is again performed. In this case, the diameter of the aperture stop 144 in this-time bright field observation is the same as the diameter of the aperture stop 144 in the previous bright field observation.

Moreover, the operator can operate the AS dial 206, ND dial 207, N·P dial 208, and light quantity adjustment dial 209 of the operation section 2 to arbitrarily adjust the aperture stop 144, ND filter 130, Nomarski prism 224, and the voltage value of the light source. Furthermore, after the adjustment ends, the operator can turn ON the setting switch 210, and store the adjusted state in the controller 10. Thereby, when the microscopic method is set in the operation section 2 the next time, the aforementioned adjusted state is automatically set.

Moreover, when the operator operates the magnification dial 201 of the operation section 2, the arbitrary objective lens 21 can be positioned on the observation optical axis. Furthermore, when the state of each optical unit fit for the magnification of each objective lens 21 is stored beforehand in the controller 10, the state of each optical unit can automatically be set in accordance with the magnification of the objective lens 21 during operation of the magnification dial 201 of the operation section 2.

According to the first embodiment, the microscope observation tube 100 includes the respective optical units of the lamp 11, ND filter adjustment section 13, AS adjustment section 14, FS adjustment section 15, polarizer attachment/detachment section 17, bright field/dark field switching section 18, Nomarski adjustment section 22, analyzer attachment/detachment section 23,. Therefore, the systems (microscopic methods) of various observations such as the bright field observation, dark field observation, polarization observation, and differential interference observation can be constituted by one microscope observation tube 100. Moreover, these microscopic methods can automatically and easily be switched by the operation of the operation section 2 by the operator.

Moreover, since the microscope observation tube 100 is constituted of a plurality of optical units, assembly and maintenance can easily be performed, and the unit can also be compacted. Furthermore, since the respective optical units individually have drive sources (motors), totally automatic control can be achieved. Additionally, since the controller 10 is integrally constituted in the microscope observation tube 100, the wiring to each optical unit is shortened, the influence of noise from the outside is not easily exerted, and each optical unit is smoothly driven. Moreover, the controller 10 may be constituted as a single unit without being incorporated in the microscope unit 1 in accordance with the convenience of the constitution.

Furthermore, since the microscope observation tube 100 has a structure attachable/detachable with respect to a desired position, the unit can function as the microscope in any apparatus, and has a broad general-purpose property. Moreover, the focusing slider 261 with the revolver 20 attached thereto is disposed so as to automatically move in the observation optical axis direction with respect to the microscope observation tube 100 in accordance with the operation of the operation section 2 by the operator. Therefore, it is unnecessary to vertically move a stage as in the conventional microscope.

Additionally, since the attachment portion 3 is disposed on the upper surface of the microscope observation tube 100, image pickup apparatuses such as the CCD camera, eyepiece observation tubes, and the like can be attached to the attachment portion 3. An enlarged image of an observed image by the bright field observation, dark field observation, polarization observation, differential interference observation, or the like is displayed in displays such as the monitor television 5, and the sample can be observed by the image pickup apparatus. Moreover, when the lamp house 111 is disposed on the side surface of the microscope observation tube 100, the length of the whole microscope observation tube 100 can be reduced, and therefore the mechanical strength of the microscope observation tube 100 is enhanced.

An application example of the microscope unit will be described hereinafter.

Figure 15:
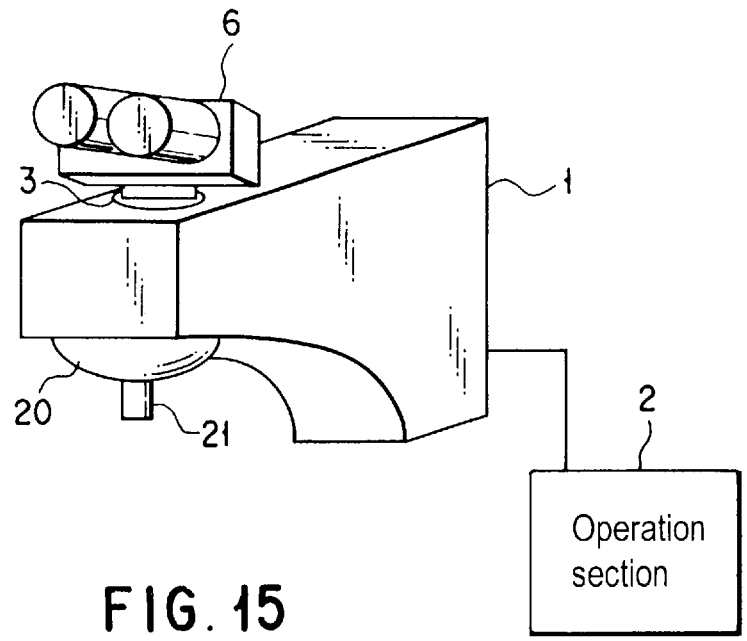
FIG. 15 is a diagram showing a first application example of the microscope unit according to the embodiment of the present invention.

FIG. 15 is a diagram showing a first application example of the microscope unit. In FIG. 15, the same parts as those of FIGS. 1 and 2 are denoted by the same reference numerals. In FIG. 15, an eyepiece observation tube 6 is attached to the attachment portion 3.

Since the eyepiece observation tube 6 is attached to the attachment portion 3 in this manner, the operator operates the operation section 2, switches among the bright field observation, dark field observation, polarization observation, and differential interference observation, and can visually observe the sample via the eyepiece observation tube 6 by the microscopic methods.

Figure 16:
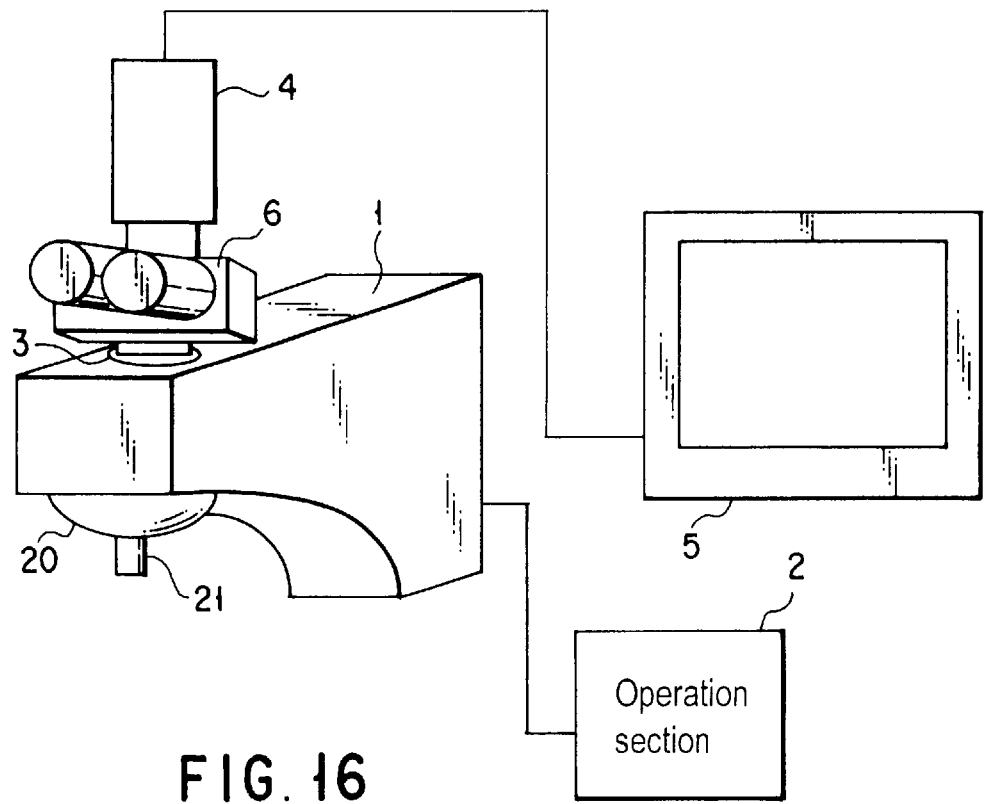
FIG. 16 is a diagram showing a second application example of the microscope unit according to the embodiment of the present invention.

FIG. 16 is a diagram showing a second application example of the microscope unit. In FIG. 16, the same parts as those of FIGS. 1 and 2 are denoted by the same reference numerals. In FIG. 16, the CCD camera 4 is attached to the attachment portion 3 together with the eyepiece observation tube 6.

Since the eyepiece observation tube 6 and CCD camera 4 are attached to the microscope unit 1 in this manner, the operator operates the operation section 2, switches among the bright field observation, dark field observation, polarization observation, and differential interference observation, and can visually observe the sample via the eyepiece observation tube 6 by the microscopic methods. Additionally, the same image is displayed in the monitor television 5 by the image pickup apparatus, and the enlarged image of the sample can be observed.

Figure 17:
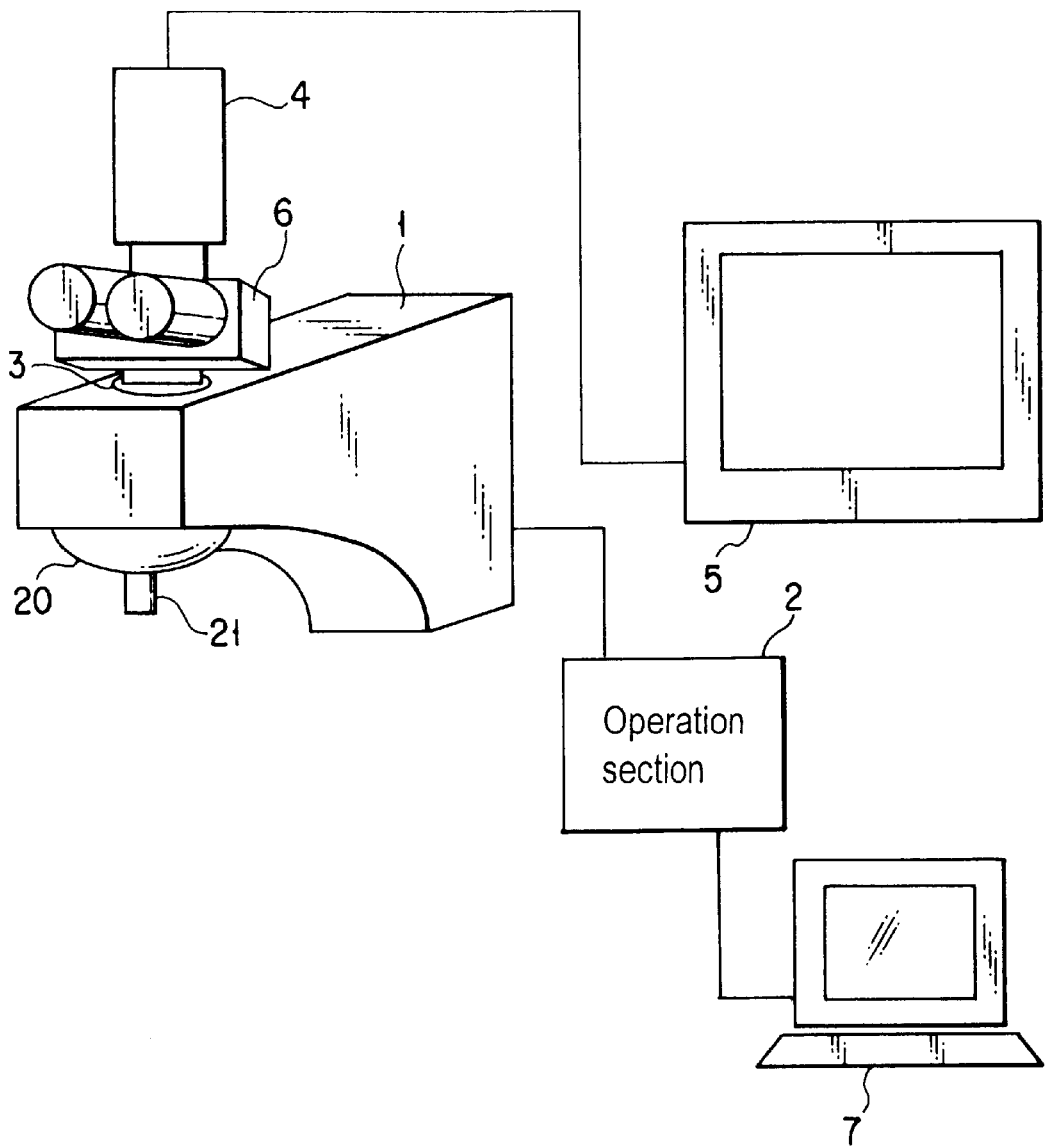
FIG. 17 is a diagram showing a third application example of the microscope unit according to the embodiment of the present invention.

FIG. 17 is a diagram showing a third application example of the microscope unit. In FIG. 17, the same parts as those of FIGS. 1 and 2 are denoted by the same reference numerals. In FIG. 17, the controller 2 is connected to a personal computer 7.

The personal computer 7 transmits the operation instruction for the microscope unit 1 by the operator to the controller 2. The operation instruction from the personal computer 7 is related to the control of light quantity of the lamp 11, adjustment control of the ND filter 130 by the ND filer adjustment section 13, adjustment control of the aperture stop 144 by the AS adjustment section 14, adjustment control of the field stop 153 by the FS adjustment section 15, attachment/detachment control of the polarizer 177 by the polarizer attachment/detachment section 17, switch control of the bright field cube 186 and dark field cube 187 by the bright field/dark field switching section 18, switch control of the shutter 190 by the shutter switching section 19, adjustment control of attachment/detachment and lateral deviation of the Nomarski prism 224 by the Nomarski adjustment section 22, attachment/detachment control of the analyzer by the analyzer attachment/detachment section 23, rotation control of the revolver 20 by the revolver driver 24, movement control of the revolver 20 in the observation optical axis direction by the focusing driver 25, and control instruction for the auto focus controller 26.

Moreover, the personal computer 7 can send the operation instruction to the controller 2 according to an operation procedure of the microscope unit 1 programmed by the operator.

Figure 18:
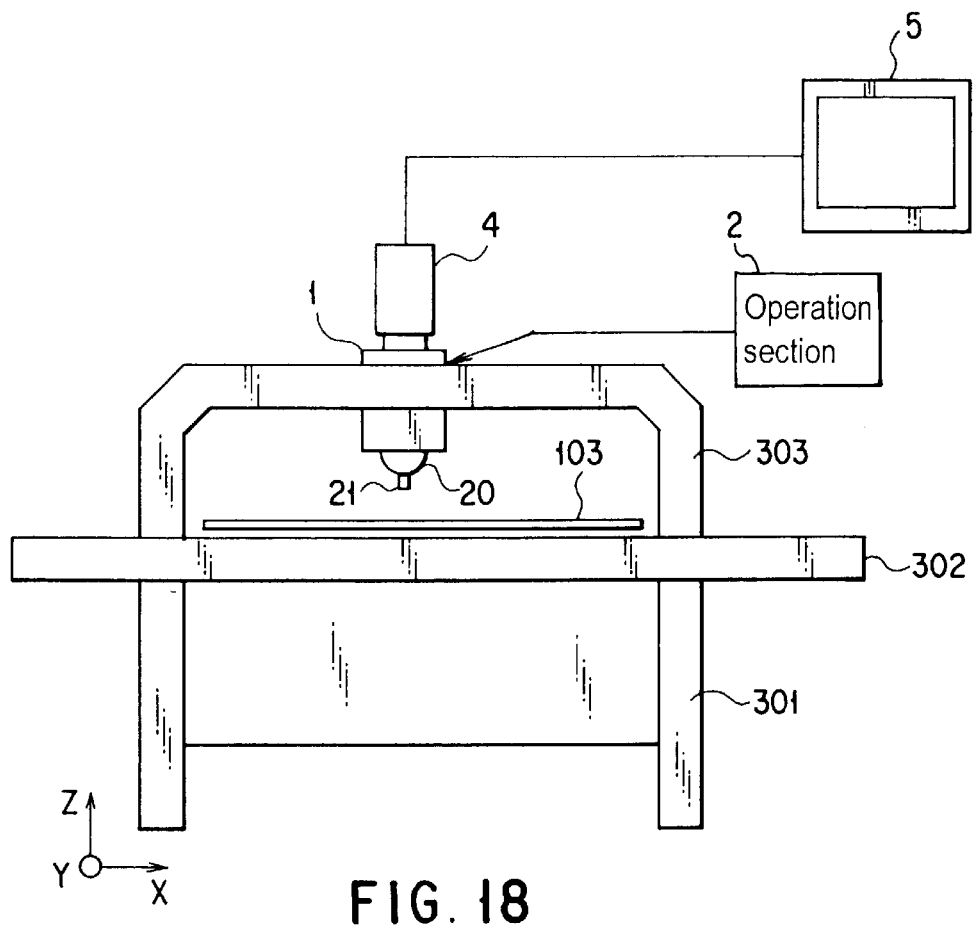
FIG. 18 is a diagram showing a fourth application example of the microscope unit according to the embodiment of the present invention.

FIG. 18 is a diagram showing a fourth application example of the microscope unit. In FIG. 18, the same parts as those of FIGS. 1 and 2 are denoted by the same reference numerals. In FIG. 18, the microscope unit 1 is attached to a large-sized substrate test apparatus for testing a glass substrate for use in a liquid crystal display.

A base 302 is disposed on a trestle 301. A stage 305 with the glass substrate laid thereon is disposed on the base 302 so as to be movable in a Y direction. Moreover, a gatepost arm 303 is disposed on the base 302, and the microscope unit 1 is disposed so as to be movable in an X direction with respect to a horizontal beam of the gatepost arm 303. The controller 10 of the microscope unit 1 receives the operation instruction from the operation section 2. The CCD camera 4 is attached to the attachment portion 3, and the image picked up by the CCD camera 4 is displayed in the monitor television 5.

In the large-sized substrate test apparatus, the glass substrate is laid on the stage 305, and in this state an operation of moving the stage 305 in the Y direction and operation of moving the microscope unit 1 in the X direction are repeated, so that the image of the whole surface of the glass substrate is picked up. The image of each test point of the glass substrate is displayed in the monitor television 5. In this case, switching among the bright field observation, dark field observation, polarization observation, and differential interference observation is performed, the image of the sample by the microscopic method is displayed in the monitor television 5, and the enlarged image of the sample can be tested by the operation of the operation section 2 by the operator.

Figure 19:
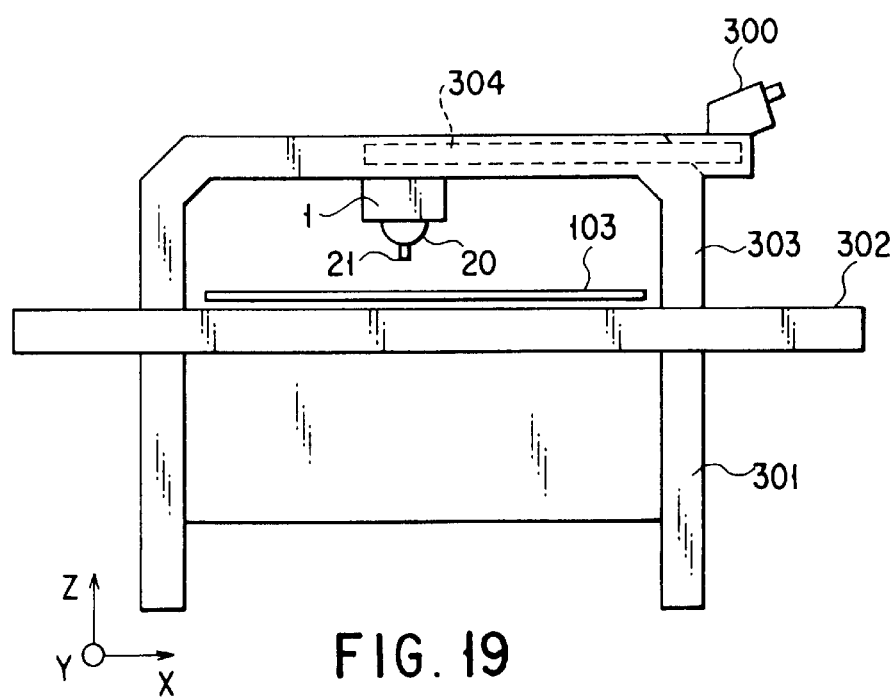
FIG. 19 is a diagram showing a fifth application example of the microscope unit according to the embodiment of the present invention.

FIG. 19 is a diagram showing a fifth application example of the microscope unit. In FIG. 19, the same parts as those of FIGS. 1, 2, 18 are denoted by the same reference numerals. In FIG. 19, the microscope unit 1 is applied to the large-sized substrate test apparatus.

The microscope unit 1 is disposed on the horizontal beam of the gatepost arm 303 so as to be movable in the X direction. An extension optical system 304 optically connected to the observation optical system of the microscope unit 1 is disposed in the horizontal beam of the gatepost arm 303. An eyepiece observation tube 300 is attached to the other end of the extension optical system 304.

In the large-sized substrate test apparatus, the glass substrate as the sample is laid on the stage 305, and in this state the operation of moving the stage 305 in the Y direction and operation of moving the microscope unit 1 in the X direction are repeated, so that the operator can test the sample by the bright field observation, dark field observation, polarization observation, or differential interference observation via the eyepiece observation tube 300.

Figure 20A:
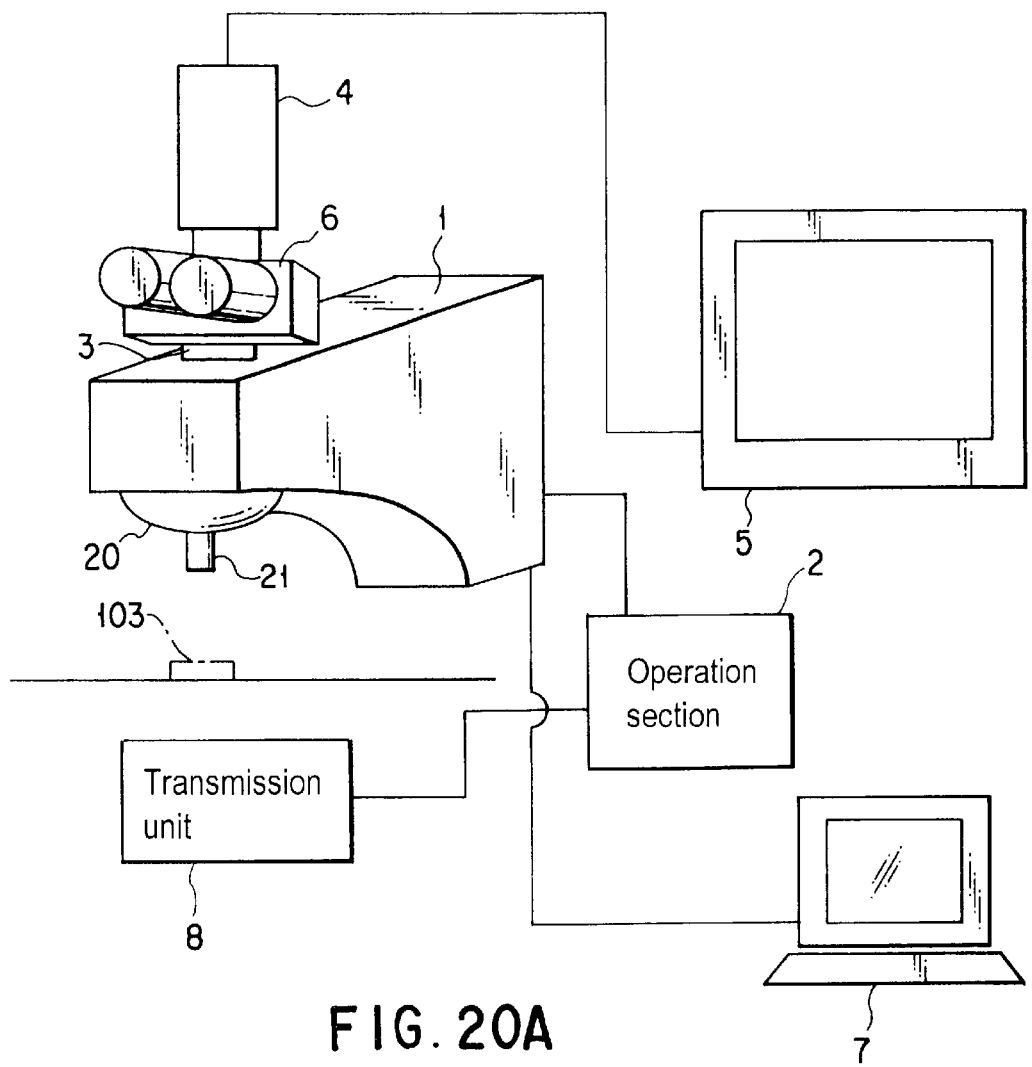
FIGS. 20A, 20B are diagrams showing configurations of a microscope system according to a second embodiment of the present invention.
Figure 20B:
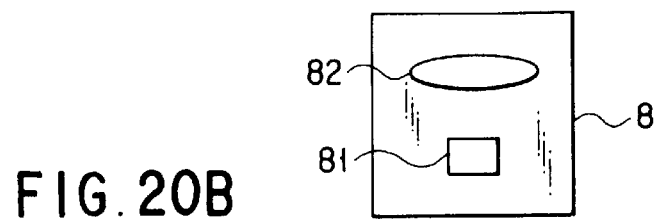

FIG. 20A is a diagram showing a configuration of a microscope system according to a second embodiment of the present invention. In FIG. 19A, the same parts as those of FIGS. 1, 2, 17 are denoted by the same reference numerals. This microscope unit is constituted by adding a transmission unit 8 to the microscope unit shown in FIG. 17. As shown in FIG. 20B, the transmission unit 8 includes a light source for transmission 81 and a condenser lens 82. The transmission unit 8 is disposed under the glass substrate 103 as the sample.

The microscope unit can function as a transmission microscope in addition to the function of the first embodiment. When the operator performs an operation of transmission observation with the operation section 2, the controller 10 sends an instruction for the transmission observation to the transmission unit 8. Then, in the transmission unit 8, the light source for transmission 81 is lit, and the substrate to be tested 103 as the sample is irradiated with an illumination light for transmission via the capacitor lens 82.

In this transmission microscope, the sample is irradiated with the illumination light for transmission via the condenser lens 82, and the light from the sample is incident upon the eyepiece observation tube 6 and CCD camera 4 from the objective lens 20 via the bright field cube. Thereby, the operator can visually transmission-observe the sample via the eyepiece observation tube 6. Additionally, the same image is displayed in the monitor television 5, and the enlarged image of an transmission image of the sample can be observed.

According to the second embodiment, since the transmission unit 8 is added to the constitution of the first embodiment, in addition to the effect of the first embodiment, the microscope unit can function as a transmission microscope.

Additionally, the present invention is not limited only to the aforementioned respective embodiments, and can appropriately be modified and implemented without changing the scope.

According to the present invention, there can be provided a microscope unit which can freely be attached/detached with respect to a desired place and has a general-purpose property, or which can automatically change a microscopic method.

What is claimed is:

1. A microscope unit comprising:
various optical units selectively switching a currently set microscopic method included in a group of a bright field observation method, a dark field observation method, and at least one of a polarization observation method and a differential interference observation method to another microscopic method included in the group, and comprising:
 a polarizer attachment/detachment section including a polarizer;
a bright field/dark field switching section including a bright field cube and a dark field cube;
 a Nomarski adjustment section including a Nomarski prism; and
 an analyzer attachment/detachment section including an analyzer;
 a revolver for an objective lens, to which at least one objective lens is attached;
 a focusing mechanism which moves the revolver for the objective lens along an optical axis and focuses said objective lens selectively inserted onto the optical axis;
 a microscope observation tube in which said various optical units, said revolver for the objective lens, and said focusing mechanism each having electromotive actuators are integrally incorporated; and
 an attachment portion which is disposed on the microscope observation tube and which is detachably attachable with respect to supports of various test apparatuses.

2. The microscope unit according to claim 1, wherein each of said various optical units comprises an ND filter adjustment section including an ND filter, an aperture stop adjustment section including an aperture stop, and a field stop adjustment section including a field stop.

3. The microscope unit according to claim 1, wherein said microscope observation tube further integrally comprises a controller which controls the respective electromotive actuators disposed on said various optical units, said revolver for the objective lens, and said focusing mechanism.

4. The microscope unit according to claim 3, wherein said controller controls the respective electromotive actuators of said various optical units in accordance with the microscopic method indicated from an operation section.

5. The microscope unit according to claim 1, wherein said microscope observation tube has an optical axis for macro observation disposed in parallel with and at a predetermined distance apart from an optical axis for micro observation attached to said revolver for the objective lens, and comprises an electromotive shutter switching section which selectively shuts off one of an optical path of micro observation and an optical path of macro observation divided from the optical path of micro observation.

6. The microscope unit according to claim 5, wherein said electromotive shutter switching section comprises:

an electromotive actuator;

a shutter formed into an L-shape by two shielding plates, each of which has a through hole; and a guide member which guides said shutter in a longitudinal direction, and said controller controls/drives said electromotive actuator to move said shutter along said guide member, thereby selectively shutting off one of said optical path of micro observation and said optical path of macro observation and placing a predetermined one of said through holes in another one of said optical path of micro observation and said optical path of macro observation.

7. The microscope unit according to claim 1, wherein said focusing mechanism moves an objective lens for micro observation attached to said revolver for the objective lens and an objective lens for macro observation along said optical axis for micro observation and along said optical axis for macro observation, respectively.

8. The microscope unit according to claim 7, wherein said focusing mechanism comprises:

a ball screw which is caused to rotate when said electromotive actuators are driven by control of said controller;

a direct acting member which is caused to move by rotation of said ball screw;

a link member which is caused to rotate by movement of said direct acting member; and a focusing slider which is caused to move up and down by rotation of said link member.

* * * * *